United States
Mouchart

[15] 3,635,563
[45] Jan. 18, 1972

[54] APPARATUS FOR DETECTING SMALL ROTATIONS

[72] Inventor: Jacques Mouchart, L'Hay-Les-Roses, France
[73] Assignee: Compagnie Generale D'Electricite, Paris, France
[22] Filed: Nov. 18, 1969
[21] Appl. No.: 877,724

[30] Foreign Application Priority Data
Nov. 18, 1968 France..................174,261

[52] U.S. Cl................................356/114, 250/225, 350/152, 350/285, 356/118
[51] Int. Cl. ................................G01n 21/40
[58] Field of Search..................250/225; 350/152, 285; 356/114–118

[56] References Cited

UNITED STATES PATENTS

| | | | |
|---|---|---|---|
| 2,666,355 | 1/1954 | Trumit | 356/116 |
| 3,306,159 | 2/1967 | Beall, Jr. et al. | 356/114 |
| 3,427,108 | 2/1969 | Vyce | 356/117 |
| 3,474,255 | 10/1969 | White | 250/225 |

FOREIGN PATENTS OR APPLICATIONS

| | | | |
|---|---|---|---|
| 1,033,889 | 1953 | France | 356/114 |

Primary Examiner—Ronald L. Wibert
Assistant Examiner—J. Rotherberg
Attorney—Sughrue, Rothwell, Mion, Zinn & Macpeak

[57] ABSTRACT

Slight rotations are detected by the variation, according to the angle of incidence, of dephasing introduced by a total reflection between the light polarized perpendicularly to the plane of incidence, and that which is polarized parallel to this plane. The apparatus includes a polarized light source, a prism with a parallelogram-shaped section in which the light undergoes four total reflections, a dephasing plate, an analysis polarizer, and a light detector.

4 Claims, 1 Drawing Figure

PATENTED JAN 18 1972 3,635,563
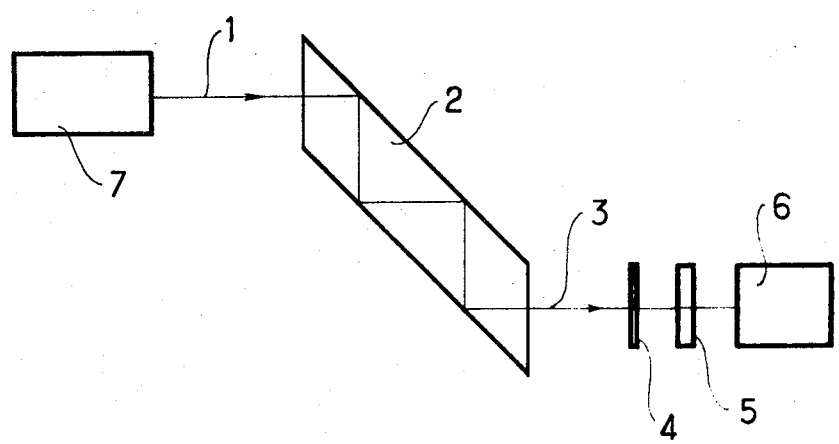

APPARATUS FOR DETECTING SMALL ROTATIONS

BACKGROUND OF THE INVENTION

1. Field of the Invention

The present invention concerns the detection of small rotations, such as of a support, by study of a light beam emerging from an optical system fixed to the support; the light beam, which reaches the optical system and gives rise to this emergent beam, being fixed. The invention is equally applicable to the detection of small rotations of the beam arriving at the fixed optical system.

2. Description of the Prior Art

Various apparatus for detecting small rotations of a support with the aid of an optical system fixed to the support are known. For example, a fixed light beam may be sent to a mirror fixed to the support, and the illumination may be measured at some point which the reflected beam more or less reaches, depending upon the angular position of the mirror. Such apparatus, although of high sensitivity, are generally cumbersome.

SUMMARY OF THE INVENTION

The present invention obviates these disadvantages and relates to an apparatus for detecting small rotations of a transparent block in relation to the direction of propagation of an incident polarized light beam, comprising at least one reflecting face, from which the incident light beam is internally reflected at an angle of incidence in the neighborhood of the critical angle of total reflection. It comprises, in addition, means for detecting the light emerging from the block, characterized in that the detecting means is disposed in the path of the beam reflected from the reflecting face. An analyzing polarizer is disposed in this path between the face and the detecting means.

BRIEF DESCRIPTION OF OF THE DRAWING

The single FIGURE is a sectional view of the apparatus according to the invention.

DESCRIPTION OF THE PREFERRED EMBODIMENT

It is known that when a light ray is internally reflected to a material having a relatively high optical index of refraction (glass) from a surface separating this material from another material having a relatively low index (air) at an angle in the neighborhood of the critical angle of total reflection, the reflection introduces between the components of the beam, polarized in parallel relationship and perpendicularly to the plane of incidence, a phase difference which varies very rapidly as a function of the angle of incidence. The phase difference angle $a$ is defined as a function of the incidence $i$ and of the relative index $n$ of the external medium by the equation:

$$\tan \frac{a}{2} = \frac{\cos i}{\sin^2 i} \sqrt{\sin^2 i - n^2}$$

Since a linearly polarized light beam is converted by the reflection into an elliptically polarized beam this has the result that the eccentricity of the polarization ellipse will vary rapidly with the angle of incidence. Now, it is easy to measure the eccentricity of the polarization ellipse by measuring the luminous intensity passing through an appropriately oriented analyzing polarizer.

There will be seen in the FIGURE a monochromatic light beam 1 polarized at 45° to the plane of the FIGURE. This beam penetrates the interior of a prismatic block 2, of which the cross section is shown in the form of a parallelogram in the FIGURE. This block consists of a glass having a high optical index of refraction, which may be, for example, the glass F 4820 of Societe Francaise SOVIREL having an index of refraction of 1.9. This light beam is reflected four times in succession, alternately from two plane and parallel reflection faces of the block 2. These reflections advantageously take place at angles close to the critical angle of total reflection, but the reflection advantageously remains total regardless of the variation of the angle of incidence, at least as long as this variation remains within practical limits.

By multiplication of the number of reflections it is possible to multiply the phase difference between the luminous vibrations, parallel and perpendicular to the plane of incidence, with is the same for all the reflections. The number of such reflections is advantageously an even number, so that the emergent beam 3 is parallel to the incident beam 1. The polarization of this beam 3 is elliptical, and the variation of the eccentricity of the ellipse, as a function of the angle of incidence, is very rapid. The eccentricity is detected with the aid of an analyzing polarizer 5, the plane of polarization of which is appropriately oriented, and with the aid of a light detector 6. The sensitivity may be improved by interposing a phase-shifting plate 4 between the block 2 and the polarizer 5, so as to obtain, for example, linearly polarized light when the angle of incidence is at its normal value. The analyzing polarizer 5 may then be so oriented as to allow the passage of only the light polarized perpendicularly to the plane of this linear polarization and then receives light only when the angle of incidence departs from its normal value.

The beam 1 may be produced, for example, by a fixed laser 7, the block 2 being fixed to a support, the small rotations of which must be detected. The elements 4, 5 and 6 may be either fixed or mounted on the support.

The overall dimensions of such an apparatus may be made small, the reduction of the length of the path of the light beam outside the block 2 having no influence on the sensitivity. On the other hand, the emergent beam always remains parallel to the incident beam, whereby the difficulty of assembly is reduced.

What is claimed is:

1. Apparatus for detecting small rotations of an element made of transparent material comprising: a luminous source for directing a fixed polarized luminous beam into said element, said element comprising two plane and parallel reflecting faces on which the beam is alternately reflected inside said element and wherein at least one reflecting surface portion of said element in the path of the luminous beam has the angle of incidence of said beam on said reflecting portion in the neighborhood of the critical angle of total reflectance thereof, an analyzing polarizer disposed in the path of the luminous beam emerging from said element and means for detecting the intensity of the light emerging from said polarizer, whereby; the variation of intensity of said beam is representative of the rotation of the said element around an axis other than an axis perpendicular to said reflecting portion and the axis of propagation of said fixed polarized luminous beam.

2. The apparatus according to claim 1, wherein the form of said element is such that the beam internally undergoes the same number of reflections from the two plane and parallel reflecting faces.

3. Apparatus for detecting small rotations of an element made of transparent material comprising: a luminous source for directing a fixed polarized luminous beam into said element, said element comprising inlet and outlet faces respectively through which the light beam enters and leaves which are plane and perpendicular to the light beam and wherein at least one reflecting surface portion of said element lies in the path of the luminous beam in said element with the angle of incidence of said beam on said reflecting portion being in the neighborhood of the critical angle of total reflection thereof, an analyzing polarizer disposed in the path of said luminous beam emerging from said element and means for detecting the intensity of light emerging from said polarizer, whereby; the variation of intensity of said beam is representative of the rotation of said element around an axis other than an axis perpendicular to said reflecting portion and the axis of propagation of said fixed polarized luminous beam.

4. The apparatus according to claim 3, wherein said transparent element has the form of a prism whose cross section is a parallelogram.